United States Patent [19]

Schlenker

[11] 4,114,400
[45] Sep. 19, 1978

[54] SAFETY SLEEVE

[75] Inventor: H. Oscar Schlenker, Aberdeen, S. Dak.

[73] Assignee: Safeguard Automotive Corporation, Aberdeen, S. Dak.

[21] Appl. No.: 776,729

[22] Filed: Mar. 11, 1977

[51] Int. Cl.² .............................................. F16C 1/06
[52] U.S. Cl. ........................................ 64/3; 64/32 R; 74/609
[58] Field of Search ............... 64/1 R, 1 S, 1 V, 3, 64/32 R; 74/609; 403/23

[56] References Cited

U.S. PATENT DOCUMENTS

| | | | |
|---|---|---|---|
| 1,499,694 | 7/1924 | Rogers | 74/550 |
| 2,376,432 | 5/1945 | Henson | 408/113 |
| 2,451,440 | 10/1948 | Lidington | 74/609 |
| 2,971,399 | 2/1961 | Roberts | 74/609 |
| 3,104,681 | 9/1963 | Gray | 138/96 |
| 3,386,312 | 6/1968 | Weasler | 74/609 |
| 3,641,840 | 2/1972 | Rossler et al. | 74/609 |
| 3,797,329 | 3/1974 | Quirk | 74/609 |

Primary Examiner—Edgar W. Geoghegan
Attorney, Agent, or Firm—Merchant, Gould, Smith, Edell, Welter & Schmidt

[57] ABSTRACT

A safety sleeve for exposed rotating shafts, in particular, for cylindrical shafts with smooth outer surfaces. The safety sleeve includes an enclosure member that substantially encloses the exposed shaft. The enclosure member is mounted to the shaft in releasable driving engagement with a mounting member which is firmly secured to the shaft. The enclosure member is normally rotatably driven by the mounting member, but when there is external contact with the enclosure member the enclosure member is released from driving engagement with the mounting member so that the enclosure member remains stationary while the mounting member rotates with the shaft in sliding contact with the enclosure member. In the preferred embodiment the enclosure member is tubular and the mounting member is a pair of annular collars.

9 Claims, 5 Drawing Figures

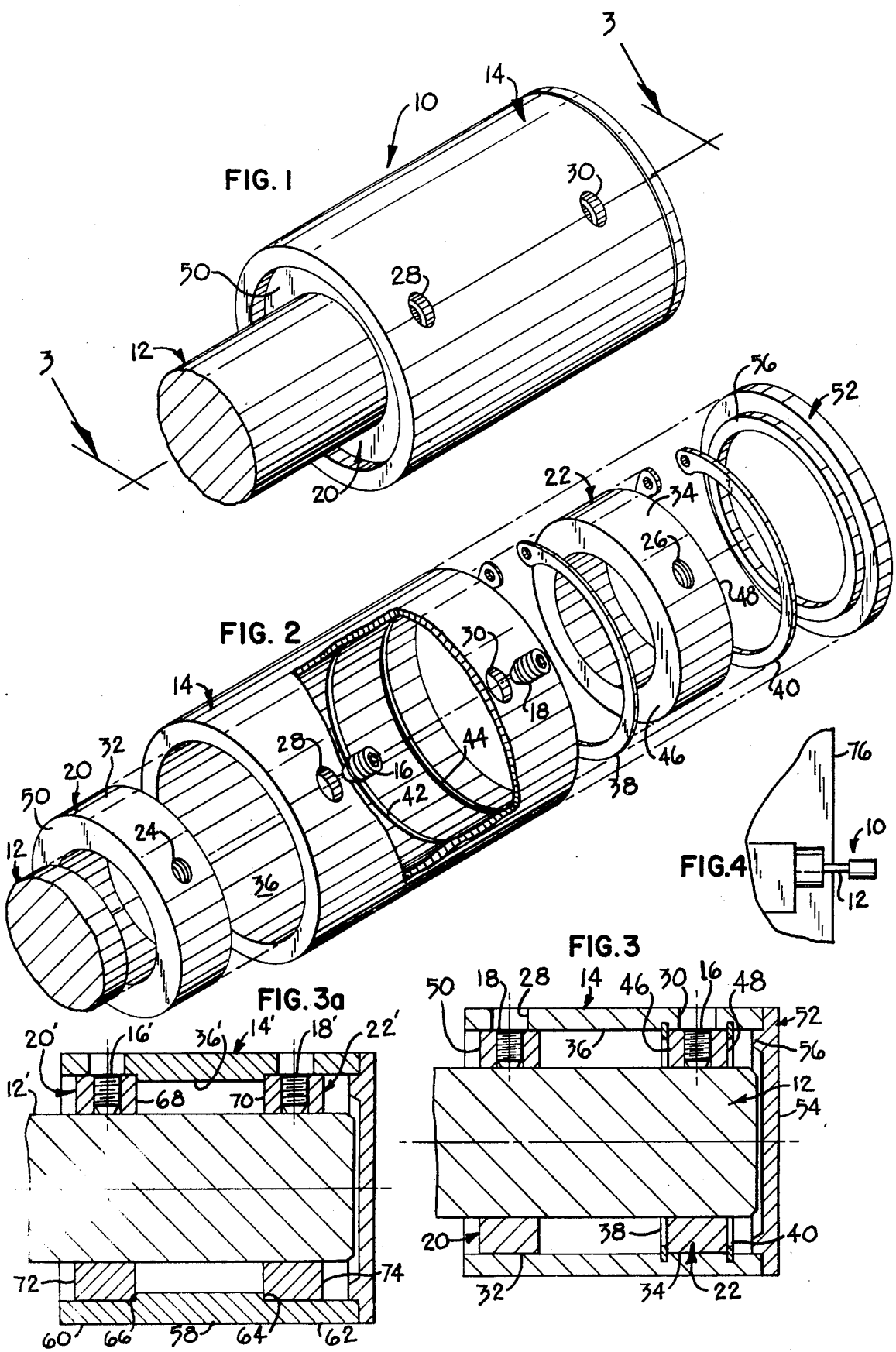

SAFETY SLEEVE

BACKGROUND OF THE INVENTION

The present invention relates to a safety sleeve for rotating shafts and, in particular, to a safety sleeve for exposed cylindrical rotating shafts of industrial machinery or equipment.

In an industrial environment, frequently the shafts of gear drives or other equipment protrude into areas subject to personnel traffic. These shafts may rotate freely and it is apparent that such shafts could cause serious injury to personnel who inadvertently come into contact with such an exposed shaft. In addition to directly inflicting physical injury, the rotating shaft may become entwined in the clothing of nearby personnel thereby pulling the individual into the industrial equipment where even more serious injury may be suffered. It is therefore desirable to provide some protective shield to prevent such injuries. It is desirable to provide a protective shield that can be easily secured to and removed from the shaft.

A number of prior art protective guards for rotating shafts are more or less permanently installed to the equipment with which the shaft is associated, or the shaft itself. Such shields cannot be used in applications where the shaft is exposed and freely rotatable intermittently and at other times used as a drive means or power take-off. It is desirable to utilize a safety sleeve that can be readily attached to the shaft while it is not being used as a drive and is thus exposed and freely rotatable. On the other hand, the protective shield should be easily removed so that the shaft can then be used as a drive or power take-off.

It is known in the prior art to provide such a removable protective shield for a shaft of a power take-off or similar rotating apparatus. The prior art device, however, may be used only with shafts having an exterior circumferential groove in which rides a ball bearing which serves to mount the protective shield on the shaft and retain the protective shield against axial translation along the axis of the shaft. In yet another prior art device, a safety cap is provided for rotating shafts having a spline construction. It will be understood that these prior art devices can only be used in applications in which the rotating shafts have the above-described circumferential groove or spline structure.

The present inventin overcomes the disadvantages of the prior art devices in that it is a safety sleeve that may be easily mounted on not only spline structured shafts but also conventional cylindrical shafts. The safety sleeve of the present invention can, therefore, by installed on exposed rotating shafts as desired and removed when the shaft is to be utilized as a drive means or power take-off.

SUMMARY OF THE INVENTION

The present invention is a safety sleeve for exposed rotating shafts and includes an enclosure member for substantially enclosing the shaft and means for mounting the enclosure member on the shaft. The mounting means is firmly secured to the shaft and is in releasable driving engagement with the enclosure member so that the enclosure member is normally driven by the mounting means to rotate in conjunction with the shaft. Upon contact with the external surface of the enclosure member the enclosure member is released from driving engagement with the mounting means and the enclosure member remains stationary while the mounting means rotates in conjunction with the shaft in sliding contact with the inner surface of the enclosure member.

In the preferred embodiment of the present invention, the enclosure member is tubular and the mounting means is a pair of annular collars. The outer surface of the annular collars and the inner surface of the tubular enclosure member are in frictional engagement such that the tubular enclosure member is driven by the annular collars to rotate in conjunction with the rotating shaft. When contact is made with the outer surface of the tubular enclosure member, the frictional engagement is broken and the tubular enclosure member remains stationary while the annular collars rotate with the shaft and in sliding contact with the inner surface of the tubular enclosure member.

The present invention further includes apparatus for retaining the tubular enclosure member against axial movement along the shaft while permitting the relative rotational movement of the shaft and annular collars with respect to the tubular enclosure member. More particularly, in one embodiment the retaining apparatus includes split rings received within grooves formed in the inner surface of the tubular enclosure member. The split rings are in contact with the annular collars to prevent axial movement of the tubular enclosure member. In an alternative embodiment, the tubular enclosure member is constructed with annular lips formed about its inner surface. The annular lips engage the annular collars to prevent the tubular enclosure member from axially moving along the shaft and eventually working its way off the shaft.

Finally, the safety sleeve of the present invention includes a cap attached to the end of the tubular member proximate the free end of the rotating shaft. The rotating shaft is thus substantially enclosed by the safety sleeve and the possibility of injury resulting from inadvertent contact with the rotating shaft is eliminated.

These and other advantages of my invention will become apparent with reference to the accompanying drawing, description of the preferred embodiment, and claims.

BRIEF DESCRIPTION OF THE DRAWINGS

FIG. 1 is a perspective view showing the present invention mounted on a rotating shaft;

FIG. 2 is an exploded perspective view of the present invention having a portion thereof cut away to show the interior of the safety sleeve;

FIG. 3 is a sectional view taken along the line 3—3 of FIG. 1;

FIG. 3A is a sectional view taken along the line 3—3 of FIG. 1 showing an alternative embodiment of the present invention; and FIG. 4 is a fragmentary view showing the installation of the present invention in an industrial environment.

DESCRIPTION OF THE PREFERRED EMBODIMENT

Referring to the drawings, wherein like numerals represent like parts throughout the several views, there is shown in FIG. 1 the safety sleeve of the present invention, designated generally as 10, mounted on an exposed rotating shaft 12. As shown more particularly in FIG. 2 — FIG. 4, safety sleeve 10 includes a tubular member 14 which substantially encloses the exposed portion of rotating shaft 12. Secured to shaft 12 by a pair of set screws 16 and 18 are annular collars 20 and 22. Set screws 16 and 18 are received within threaded apertures 24 and 26 in annular collars 20 and 22, respectively. Apertures 24 and 26 may be aligned with a pair of apertures 28 and 30 in tubular member 14 facilitating the application or removal of safety sleeve 10 from shaft 12. While set screws are shown in the preferred embodiment, it is to be understood that other types of fasteners for securing collars 20 and 22 to shaft 12 are contemplated within the scope of the present invention.

In the embodiment illustrated in FIG. 3, the outer surface 32 of collar 20 and the outer surface 34 of collar 22 are in slideable contact with inner surface 36 of tubular member 14. A pair of split retaining rings 38 and 40 are received within grooves 42 and 44 formed in the inner surface 36 of tubular member 14. Retaining rings 38 and 40 are disposed adjacent annular collar 22 such that a portion of rings 38 and 40 are in contact with annular surfaces 46 and 48 of collar 22. Split retaining rings 38 and 40 thus prevent axial translation of tubular member 14 along the central axis of shaft 12. More specifically, retaining ring 38 prevents axial movement of tubular member 14 in a direction toward the right along the central axis of shaft 12 as shown in FIG. 3. On the other hand, retaining ring 40 prevents axial movement in a direction toward the left as shown in FIG. 3. However, the rotation of annular collars 20 and 22 in conjunction with rotating shaft 12 and with respect to tubular member 14 remains unimpeded by the retaining rings 38 and 40. In an alternative embodiment, retaining ring 38 may be positioned so that is contacts an annular surface 50 of collar 20. In the alternative position, retaining ring 38 serves the same function of preventing axial translation of tubular member 14 toward the right as shown in FIG. 3.

A cap 52 is provided which mates with tubular member 14 to cover the exposed end of shaft 12. Cap 52 includes a substantially flat portion 54 having an integrally molded annular rim 56. Cap 52 may be constructed for snap-fit engagement with tubular member 14 such that the outside diameter surface of annular rim 56 engages the inner surface 36 of tubular member 14. Cap 52 may also be secured to tubular member 14 by an appropriate adhesive. It is to be understood that alternative cap devices other than the specifically disclosed cap 5 are within the scope of the present invention.

FIG. 3A illustrates an alternative embodiment of the present invention, particularly with respect to the structure for preventing axial translation of tubular member 14. in the alternative structure, tubular member 14' substantially encloses rotating shaft 12' and is supported by a pair of annular collars 20' and 22' rigidly secured to shaft 12' by threaded fasteners 16' and 18'. Tubular member 14' has a central portion 58 with an inside diameter somewhat smaller than the outside diameter of annular collars 20' and 22'. Tubular member 14' also has end portions 60 and 62 integrally formed with central portion 58 and having an inside diameter somewhat larger than the outside diameter of annular members 20' and 22'. At the juncture of central portion 58 and end portions 60 and 62 annular lips 64 and 66 are defined. Collars 20' and 22' slideably engage the inner surface 36' of tubular member 14'. Collars 20' and 22' are positioned so that their interior annular surfaces 68 and 70 slideably engage annular lips 66 and 64, respectively. The contact between surfaces 68 and 70 and annular lips 66 and 64 prevent the axial translation of tubular member 14' along the central axis of shaft 12'. In particular, annular lip 64 in contact with surface 70 of collar 22' prevents axial translation of tubular member 14 toward the right as shown in FIG. 3A. Conversely, the engagement of surface 68 with annular lip 66 will prevent the axial translation of tubular member 14' along the axis of shaft 12' in a direction toward the left as illustrated in FIG. 3A. Additionally, snap rings could be received within tubular member 14' and positioned adjacent annular surfaces 72 and 74 of collars 20' and 22', respectively, to further prevent axial translation of tubular member 14'. Such a structure would be particularly useful in the event that set screws 16' and/or 18' became loose, causing surfaces 68 and 70 to become disengaged from annular lips 66 and 64 permitting axial movement of tubular member 14'. Thus, while preventing the axial translation of tubular member 14', collars 20' and 22' are in sliding frictional contact with inner surface 36' of tubular member 14', such that collars 20' and 22' rotate in conjunction with shaft 12' and with respect to tubular member 14'.

The tubular member of sleeve 10 and the annular collars are preferably made of dissimilar materials such that the annular collars will rotate with the rotating shaft as the exterior surface of the collars slides along the inner surface of the tubular member. In one embodiment, the tubular member may be formed of a hard plastic while the annular collars are made of steel. Alternatively, the tubular member may be steel or aluminum while the annular collars are formed of hard plastic. Essentially, the tubular member must be sufficiently rigid to withstand the force of a man falling against or stepping on the tubular member.

The operation of the present invention will now be described with particular reference to FIG. 4. In FIG. 4 a piece of industrial equipment 76 is shown having a rotating shaft 12 extending beyond the edge of the equipment into a personnel area. Safety sleeve 10 is shown mounted on the exposed end of rotating shaft 12. Normally, the engagement of outer surfaces 32 and 34 of annular collars 20 and 22 with the inner surface 36 tubular member 14 is such that tubular member 14 is rotated in conjuctionwith shaft 12 and annular collars 20 and 22. When tubular member 14 is contacted on its exterior surface, the frictional engagement between annular collars 20 and 22 and tubular member 14 is broken and tubular member 14 remains essentially stationary while collars 20 and 22 rotate in conjunction with shaft 12 within tubular member 14 and in sliding engagement with inner surface 36. When the exterior contact with tubular member 14 is released, the frictional engagement between annular collars 20 and 22 and tubular member 14 will be sufficient to again cause tubular member 14 to rotate in conjunction with shaft 12. Thus, if an individual accidentally comes into contact with safety sleeve 10, he will not be injured by rotating shaft 12. It is to be understood that while a tubular structure is disclosed, alternative enclosing means in releasable driving engagement with the rotating shaft are contemplated within the scope of the present invention. Similarly, although annular securing collars are disclosed, it will be understood that alternative securing means are within the contemplated scope of the present invention.

It will be seen, therefore, that the present invention is an easily mounted safety sleeve for exposed rotating shafts. The safety sleeve rotates with the shaft until the shield is externally contacted. The shield thereafter remains stationary while the shaft continues to rotate within the shield. The protective shield can be applied to rotating shafts of varied structures, particularly cylindrical shafts.

I claim:

1. A safety sleeve for exposed rotating shafts comprising:
   (a) an enclosure member that substantially encloses said rotating shaft, said enclosure member having inner and outer surfaces;
   (b) an annular collar having an outer and an inner surface, said outer surface in direct contact and frictional engagement with said inner surface of said enclosure member, said inner surface of said collar in direct contact with the outer surface of an exposed rotating shaft, said annular collar having a threaded aperture therein;
   (c) screw means received within said threaded aperture for securing said annular collar to said shaft for rotation therewith; and
   (d) whereby said enclosure member is normally driven by said annular collar to rotate in connection with said shaft and upon contact with said outer surface of said enclosure member said enclosure member is released from driving engagement with said annular collar and said enclosure member remains stationary while said annular collar rotates with said rotating shaft and in sliding contact with said enclosure member.

2. A safety sleeve in accordance with claim 1 wherein said enclosure member is tubular.

3. A safety sleeve in accordance with claim 2 further comprising:
   means for retaining said tubular member against movement along said shaft while permitting relative rotational movement of said shaft with respect to said tubular member.

4. A safety sleeve in accordance with claim 3 wherein said retaining means further comprises:
   a pair of split rings axially aligned along said shaft in contact with the sides of said annular collar and received within grooves formed in said inner surface of said tubular member whereby axial translation of said tubular member is prevented by said contact between said split rings and said annular collar.

5. A protective sleeve in accordance with claim 4 further comprising a cap attached to said tubular member at the end thereof adjacent the free end of said rotating shaft.

6. A safety sleeve in accordance with claim 1 further comprising:
   a pair of annular collars secured to said shaft and axially spaced along said shaft, said annular collars having outer surfaces that frictionally engage said inner surface of said enclosure member to rotatably drive said enclosure member in conjunction with the rotation of said shaft, whereby said frictional engatement is broken upon contact with said outer surface of said enclosure member so that said annular collars rotate in conjunction with said shaft in sliding contact with said inner surface of said enclosure member which remains stationary.

7. A safety sleeve in accordance with claim 6 wherein said enclosure member is tubular and further comprising means for retaining said tubular member against axial movement along said shaft while permitting relative rotational movement of said shaft with respect to said tubular enclosure member.

8. A safety sleeve in accordance with claim 7 wherein said retaining means further comprises:
   a pair of split rings axially disposed along said shaft and received within grooves formed on the inner surface of said tubular member, said split rings positioned to contact at least one of said annular collars preventing axial movement of said tubular member with respect to said shaft.

9. A safety sleeve in accordance with claim 7 wherein said tubular enclosure member further comprises:
   a central portion having an inside diameter smaller than the outside diameter of said annular collars;
   first and second end portions integral with said central portion and having an inside diameter greater than the inside diameter of said central portion, said central portion and said end portions defining an annular lip at the junctions thereof, said annular collars positioned axially along said shaft to contact said annular lips whereby said tubular member is retained against axial translation along said shaft.

* * * * *